(12) United States Patent
Hanashima

(10) Patent No.: US 10,599,022 B2
(45) Date of Patent: Mar. 24, 2020

(54) DIFFUSER PLATE, DISPLAY DEVICE, PROJECTION DEVICE, AND LIGHTING DEVICE

(71) Applicant: DEXERIALS CORPORATION, Tokyo (JP)

(72) Inventor: Naoki Hanashima, Tokyo (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/743,716

(22) PCT Filed: Jun. 23, 2016

(86) PCT No.: PCT/JP2016/068727
§ 371 (c)(1),
(2) Date: Jan. 11, 2018

(87) PCT Pub. No.: WO2017/010257
PCT Pub. Date: Jan. 19, 2017

(65) Prior Publication Data
US 2018/0203334 A1    Jul. 19, 2018

(30) Foreign Application Priority Data
Jul. 16, 2015    (JP) ................. 2015-141908

(51) Int. Cl.
*G02B 5/02*    (2006.01)
*G03B 21/14*    (2006.01)
(Continued)

(52) U.S. Cl.
CPC ............... *G03B 21/14* (2013.01); *F21V 5/04* (2013.01); *G02B 3/04* (2013.01); *G02B 5/02* (2013.01);
(Continued)

(58) Field of Classification Search
CPC ...... G02B 3/00; G02B 27/09; G02B 27/0955; G02B 5/02; G03B 21/14; G03B 3/04; H04N 9/3152; F21V 5/04
See application file for complete search history.

(56) References Cited

U.S. PATENT DOCUMENTS 6,201,642 B1 *    3/2001    Bos .......................... B60R 1/00
                                                                    359/504
6,437,918 B1 *    8/2002    Hamanaka ....... B29D 11/00278
                                                                    349/57
(Continued)

FOREIGN PATENT DOCUMENTS

CN        1947034 A        4/2007
CN        103430056 A      12/2013
(Continued)

OTHER PUBLICATIONS

Feb. 12, 2019, European Search Report issued for related EP Application No. 16824237.8.
(Continued)

*Primary Examiner* — Isiaka O Akanbi
*Assistant Examiner* — Danell L Owens
(74) *Attorney, Agent, or Firm* — Paratus Law Group, PLLC

(57) ABSTRACT

There is provided a diffuser plate, a display device, a projection device, and a lighting device that can achieve flat diffusion angle distribution characteristics while reducing a high-order diffraction component, the diffuser plate including: a single lens group positioned on a surface of a transparent substrate, in which curvature radii of respective single lenses composing the single lens group are varied as a whole, and peak positions of the respective single lenses (Continued)

are located irregularly, and a lens surface shape of at least one of the single lenses in the single lens group satisfies Equation 1 and Equation 2.

11 Claims, 15 Drawing Sheets

(51) Int. Cl.
*G02B 3/04* (2006.01)
*F21V 5/04* (2006.01)
*G02B 27/09* (2006.01)
*H04N 9/31* (2006.01)

(52) U.S. Cl.
CPC ....... *G02B 27/0955* (2013.01); *H04N 9/3152* (2013.01)

(56) References Cited

U.S. PATENT DOCUMENTS

| | | |
|---|---|---|
| 2003/0002871 A1 | 1/2003 | Ohmura |
| 2004/0125048 A1* | 7/2004 | Fukuda ............. G02F 1/133526 345/30 |
| 2004/0130790 A1* | 7/2004 | Sales ................... G02B 3/0043 359/619 |
| 2009/0051833 A1 | 2/2009 | Watanabe et al. |
| 2015/0234264 A1* | 8/2015 | Kurosaki ............. G03B 21/204 353/31 |
| 2015/0293271 A1* | 10/2015 | Miyasaka ........... H04N 9/3152 353/38 |
| 2016/0320615 A1* | 11/2016 | Nakamura ........... G02B 3/0043 |

FOREIGN PATENT DOCUMENTS

| | | |
|---|---|---|
| EP | 2884332 A1 | 6/2015 |
| JP | 2003-004907 A | 1/2003 |
| JP | 2003-177221 A | 6/2003 |
| JP | 2004-505306 A | 2/2004 |
| JP | 2004-145330 A | 5/2004 |
| JP | 2006-500621 A | 1/2006 |
| JP | 2010-097034 A | 4/2010 |
| JP | 2014-035448 A | 2/2014 |
| JP | 2014-510952 A | 5/2014 |
| WO | WO 02/10804 A1 | 2/2002 |

OTHER PUBLICATIONS

May 28, 2019, Japanese Office Action issued for related JP Application No. 2015-141908.

Dec. 5, 2019, Chinese Office Action issued for related CN Application No. 201680041685.1.

* cited by examiner

● : PEAK POSITION OF SINGLE LENS LOCATED REGULARLY
○ : SET PEAK POSITION

CONVEX LENS TYPE

CONCAVE LENS TYPE

DIFFUSER PLATE, DISPLAY DEVICE, PROJECTION DEVICE, AND LIGHTING DEVICE

CROSS REFERENCE TO PRIOR APPLICATION

This application is a National Stage Patent Application of PCT International Patent Application No. PCT/JP2016/068727 (filed on Jun. 23, 2016) under 35 U.S.C. § 371, which claims priority to Japanese Patent Application No. 2015/141908 (filed on Jul. 16, 2015), which are all hereby incorporated by reference in their entirety.

TECHNICAL FIELD

The present invention relates to a diffuser plate, a display device, a projection device, and a lighting device.

BACKGROUND ART

A diffuser plate that scatters incoming light to various directions is widely utilized in various devices, for example, a display device such as a display, a projection device such as a projector, and various types of lighting devices. An incoming light diffusing mechanism in this diffuser plate is roughly classified into a mechanism that utilizes light refraction resulting from the surface shape of the diffuser plate and a mechanism that utilizes scattering by a substance existing inside a bulk body and having different refractive index from the circumference. One of the diffuser plates which utilize the light refraction resulting from the surface shape is what is called a microlens array diffuser plate including a plurality of microlenses having sizes of approximately several tens of micrometers and located on the surface of the bulk body.

The above microlens array diffuser plate including a plurality of microlenses located regularly has a feature of easily obtaining flat diffusion angle distribution characteristics, in the case where the diffusion characteristics of the diffuser plate are being focused on. On the other hand, such a microlens array diffuser plate has a problem that the microlenses located regularly exhibit a function like a diffraction grating, and an intense high-order diffraction component is being increased.

In order to prevent such increase of the high-order diffraction component, there are various proposals, such as irregularly locating the microlenses positioned on the surface of the bulk body, and setting variation in the diameters, the surface roughnesses, and the curvature radii of the respective microlenses.

For example, the following Patent Literature 1 discloses that a plurality of microlenses are located irregularly or with probability-distributional regularity, so as to differ from a basic pattern in which each of all the peak intervals between microlenses adjacent to each other has a regular interval L. In more detail, Patent Literature 1 discloses that each microlens is located such that the peak position of every microlens is positioned within a circle having a radius of 0.3L or less and centered at the peak position in the basic pattern, or each microlens is located such that the peak interval P between microlenses adjacent to each other satisfies 0.4L≤P≤1.6L.

Also, for example, the following Patent Literature 2 discloses that the diameters of the microlenses that compose the microlens array are each set to 100 μm or more and 1000 μm or less, and the surface roughnesses (Ra) of the microlenses are each set to 0.1 μm or more and 10 μm or less.

Also, for example, the following Patent Literature 3 discloses that a concave-convex portion is formed by and provided with a large number of concave portions and conic convex portions each having a peak portion that forms part of a sphere, a length L at the longest portion of a bottom portion of 5 μm to 100 μm, and a height of 5 μm to 100 μm, the concave portions and conic convex portions being arrayed on a transparent base material, and that a ratio r/L of a curvature radius r of the sphere of the peak portion to the length L of the longest portion of the bottom portion is set to 0.01 to 0.6.

CITATION LIST

Patent Literature

Patent Literature 1: JP 2003-4907A
Patent Literature 2: JP 2004-145330A
Patent Literature 3: JP 2010-97034A

SUMMARY OF INVENTION

Technical Problem

However, although a high-order diffraction component is reduced by irregularly setting the locations of the microlenses and the diameters, the surface roughnesses, and the curvature radii of the microlenses in accordance with the policy disclosed in Patent Literatures 1 to 3, the angles of the diffused light beams from the respective microlenses are varied. As a result, there is a problem that the flat diffusion angle distribution characteristics, which are a feature of the microlens array diffuser plate, are impaired. As described above, reduction of the high-order diffraction component and achievement of the flat diffusion angle distribution characteristics have a relationship of trade-off.

Thus, the present invention is made in consideration of the above problem, and the purpose of the present invention is to provide a diffuser plate, a display device, a projection device, and a lighting device that can achieve the flat diffusion angle distribution characteristics, while reducing the high-order diffraction component.

Solution to Problem

In order to solve the above problem, according to an aspect of the present invention, there is provided a microlens array diffuser plate including a single lens group positioned on a surface of a transparent substrate, in which curvature radii of respective single lenses composing the single lens group are varied as a whole, and peak positions of the respective single lenses are located irregularly, and a lens surface shape of at least one of the single lenses in the single lens group satisfies the following Equation 1 and Equation 2.

[Math. 1]

$$z = \frac{cx^2}{1+\sqrt{1-(1+k)c^2x^2}} \quad \text{(Equation 1)}$$

$$-40 \leq k \leq -20 \quad \text{(Equation 2)}$$

Where, in the above Equation 1 and Equation 2, z represents a height difference with a reference plane that is a plane which passes through a peak of the single lens in a height direction and is orthogonal to a lens optical axis of the single lens, c represents an inverse of a curvature radius of the single lens, x represents a separation distance from the lens optical axis of the single lens, and k represents a conic coefficient.

The respective single lenses are preferably located adjacent to each other.

A boundary between the single lenses adjacent to each other may include a curving line.

The curvature radius of the single lens is preferably larger than a maximum value of a pitch between single lenses in the single lens group, and in a case in which a circumscribed circle that circumscribes a single lens is considered, a minimum value of a diameter of the circumscribed circle in the single lens group is preferably larger than the maximum value of the pitch between the single lenses.

The peak positions of the respective single lenses composing the single lens group are preferably located irregularly within a range of a radius $\Delta r$ with respect to positions of peaks of the respective single lenses in a case in which the single lenses are located regularly, and, in a case in which a circumscribed circle that circumscribes a single lens is considered, the respective single lenses composing the single lens group preferably satisfy $\Delta r/a \neq 0$, where a represents a diameter of the circumscribed circle in each single lens.

The transparent substrate may be any of a quartz glass, a borosilicate glass, or a white plate glass.

Further, in order to solve the above problem, according to another aspect of the present invention, there is provided a display device including the diffuser plate.

Further, in order to solve the above problem, according to still another aspect of the present invention, there is provided a projection device including the diffuser plate.

Further, in order to solve the above problem, according to still another aspect of the present invention, there is provided a lighting device including the diffuser plate.

Advantageous Effects of Invention

According to the present invention, the flat diffusion angle distribution characteristics can be achieved while reducing the high-order diffraction component, as described above.

DESCRIPTION OF EMBODIMENTS

Figure 1:
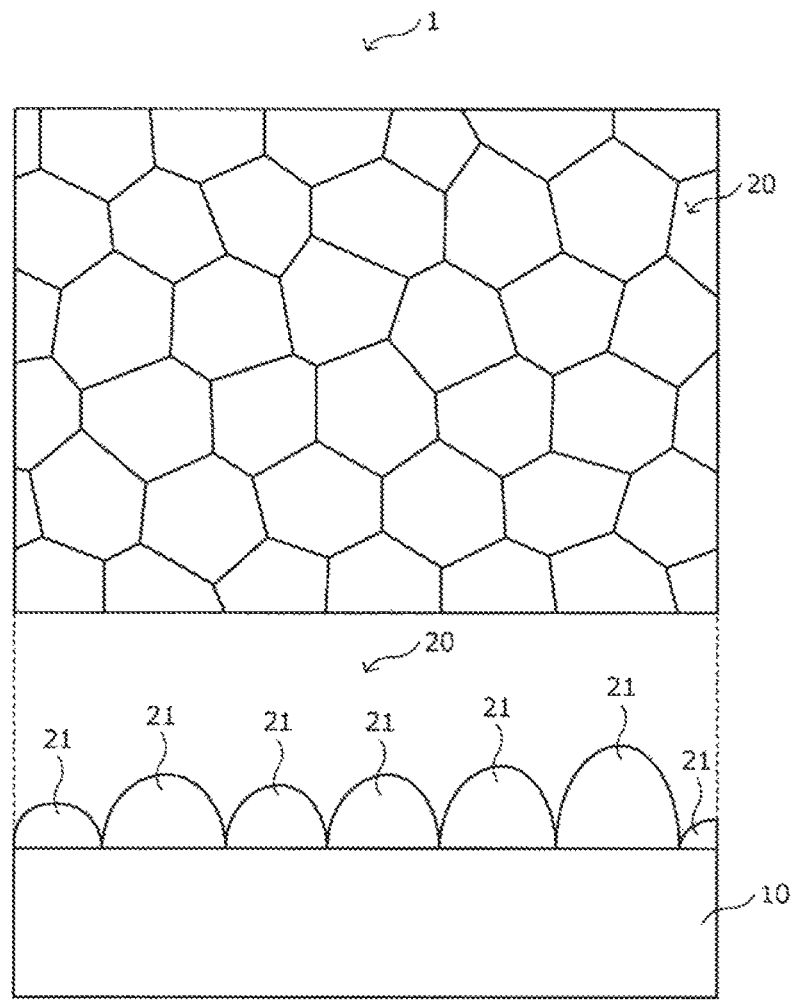
FIG. 1 is an explanatory diagram schematically illustrating a diffuser plate according to a first embodiment of the present invention.

Hereinafter, (a) preferred embodiment(s) of the present invention will be described in detail with reference to the appended drawings. Note that, in this specification and the appended drawings, structural elements that have substantially the same function and structure are denoted with the same reference numerals, and repeated explanation of these structural elements is omitted.

(With Regard to Diffuser Plate)

In the following, a diffuser plate 1 according to a first embodiment of the present invention will be described in detail, with reference to FIGS. 1 to 14B.

Figure 2:
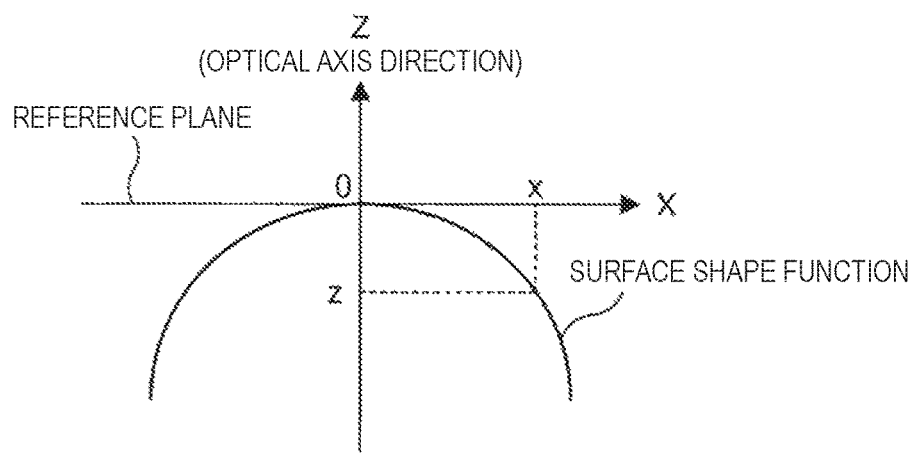
FIG. 2 is an explanatory diagram for describing a surface shape function that expresses a surface shape of a lens.
Figure 3:
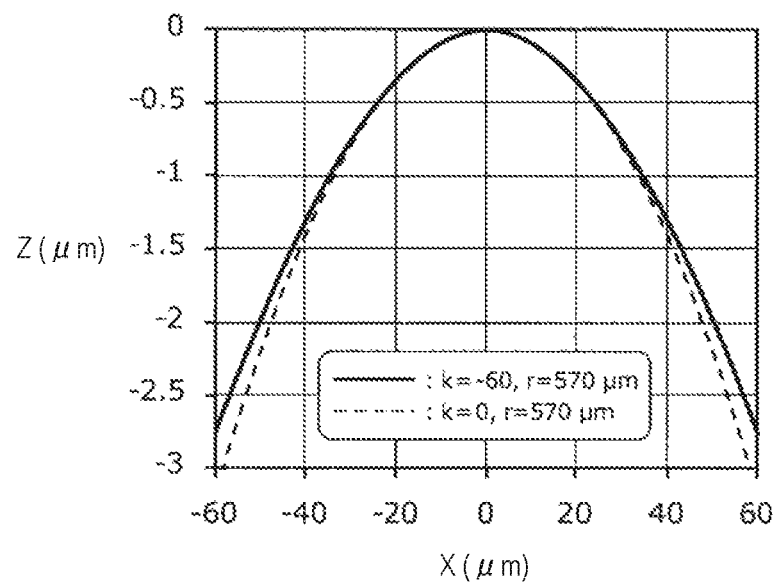
FIG. 3 is a graph that illustrates an example of a relationship between a conic coefficient and a surface shape of a lens.
Figure 4:
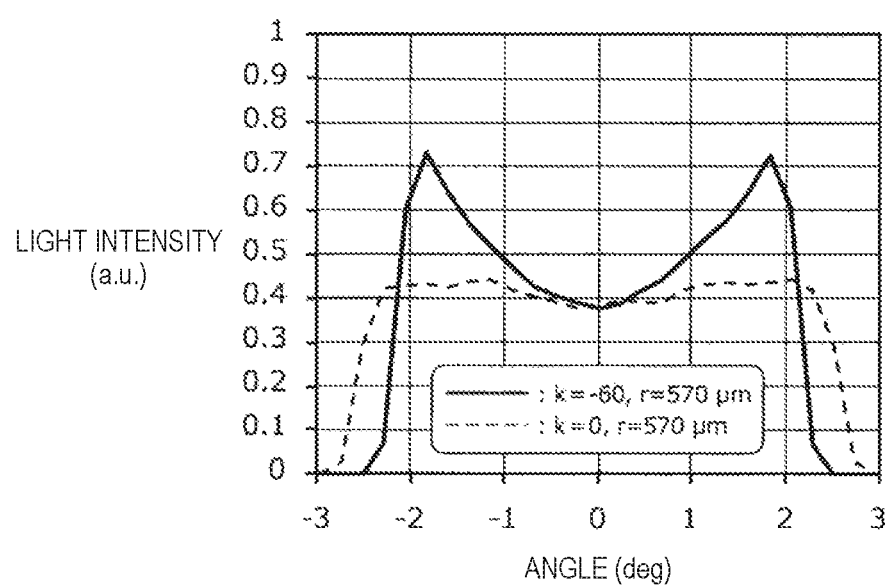
FIG. 4 is a graph that illustrates an example of a relationship between a conic coefficient and diffusion characteristics of a lens.
Figure 5:
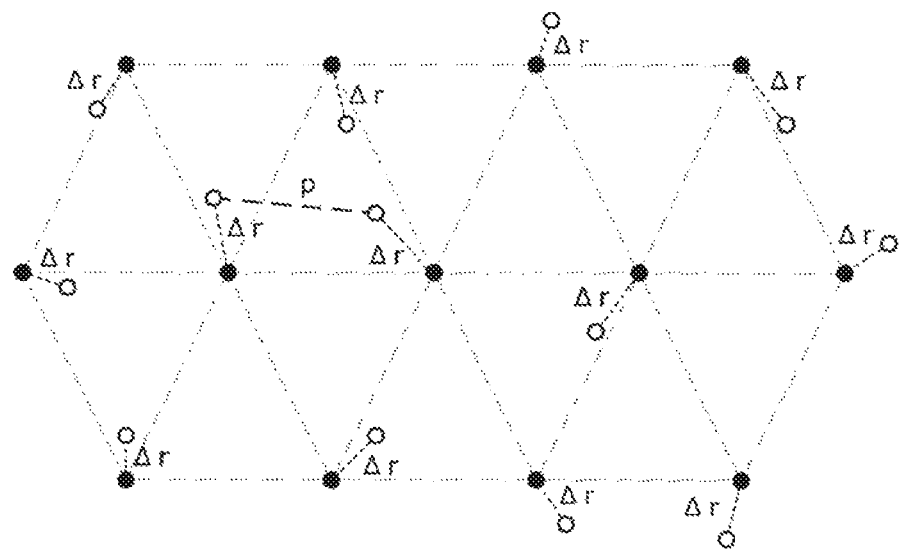
FIG. 5 is an explanatory diagram for describing peak positions of single lenses in a diffuser plate.
Figure 6:
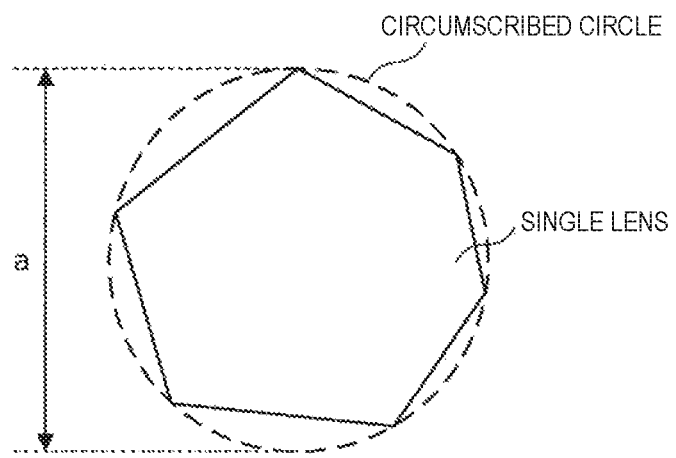
FIG. 6 is an explanatory diagram for describing a size of an outer diameter of a single lens.
Figure 7:
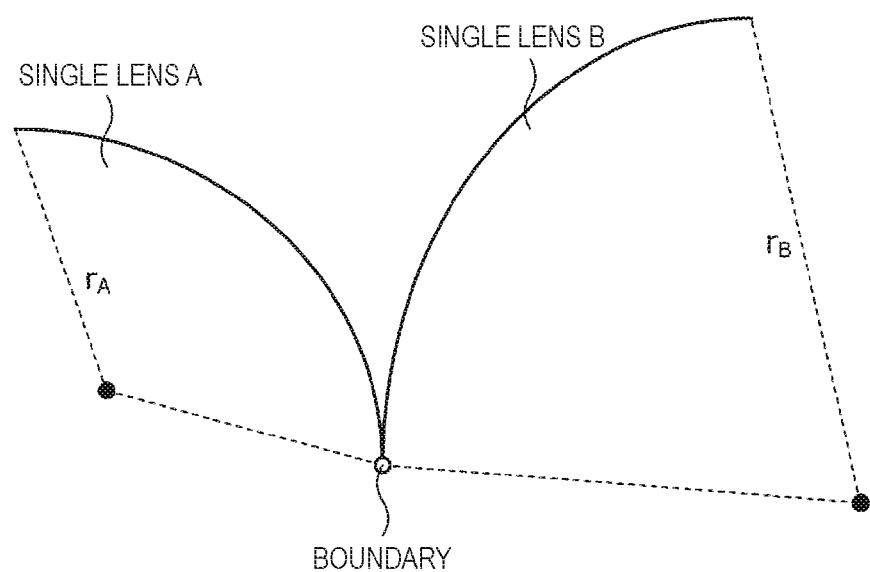
FIG. 7 is an explanatory diagram for describing a shape of a boundary between adjacent single lenses.
Figure 8:
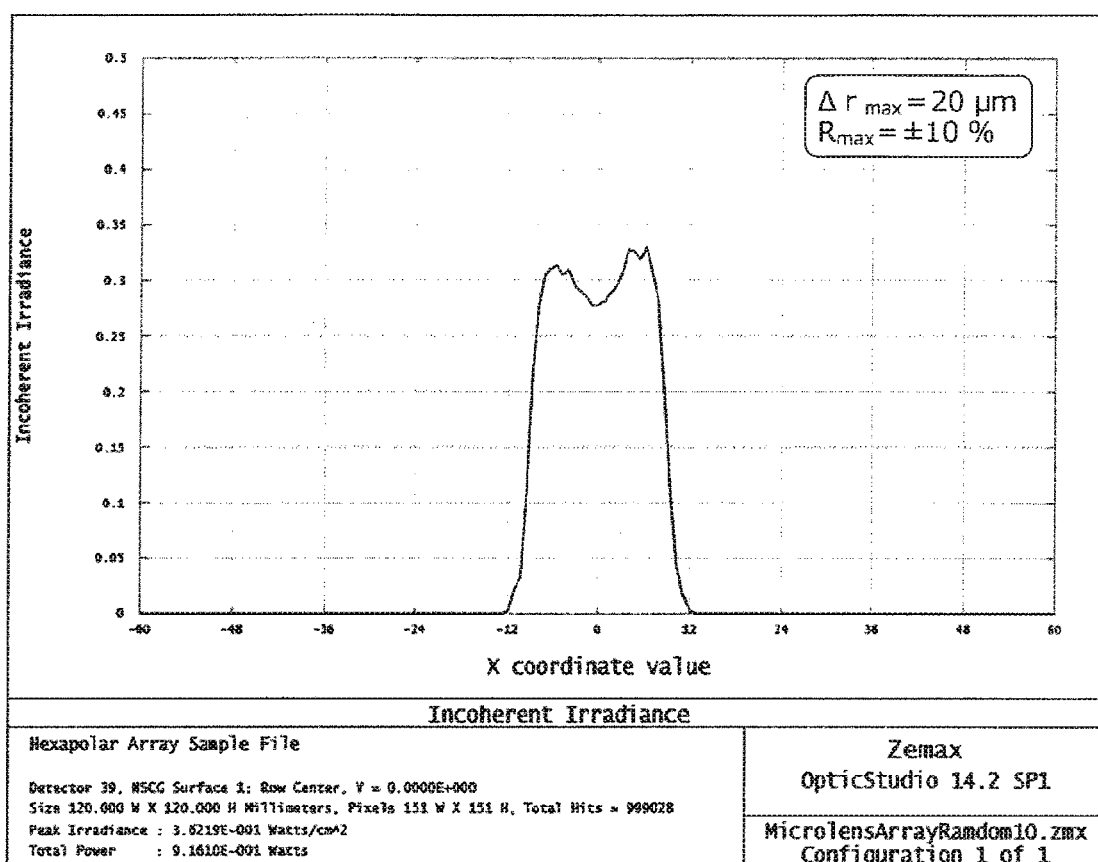
FIG. 8 is a graph that illustrates change of diffusion characteristics of a diffuser plate associated with variation of peak positions of single lenses and variation of curvature radii.
Figure 8:
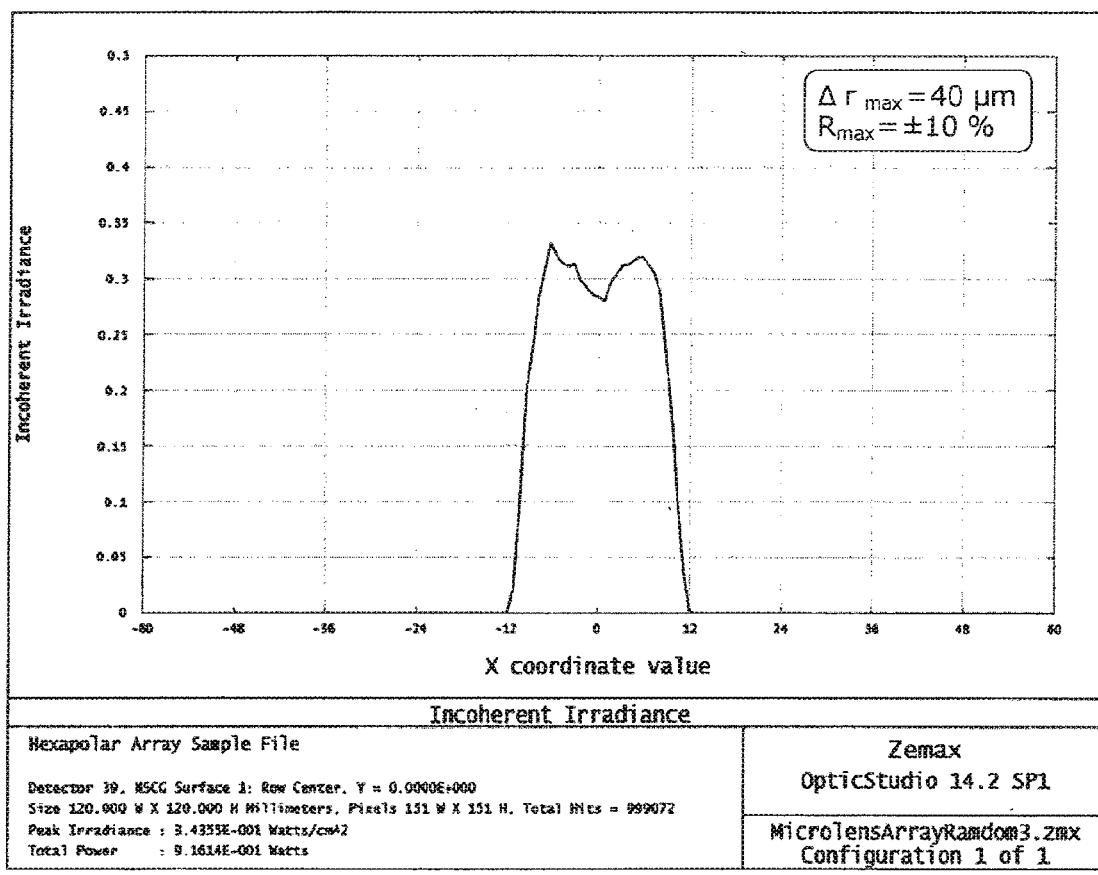
Figure 8:
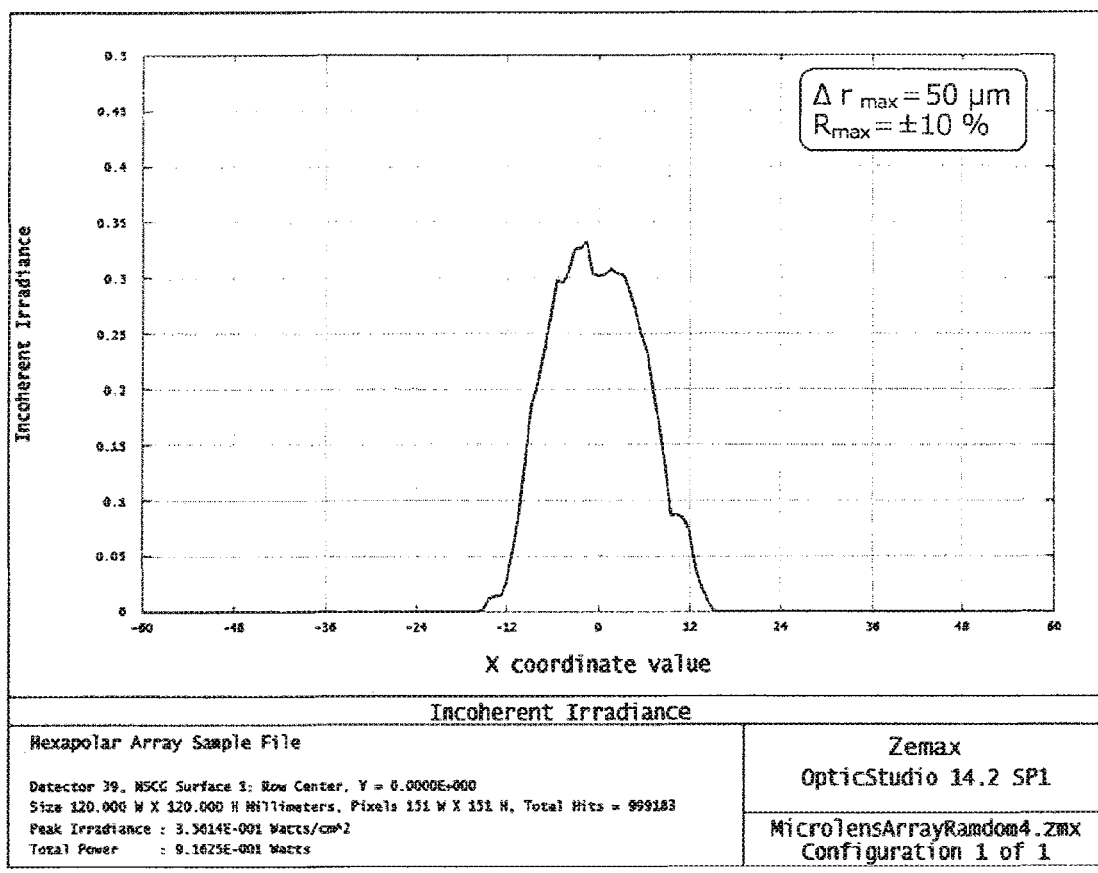
Figure 9:
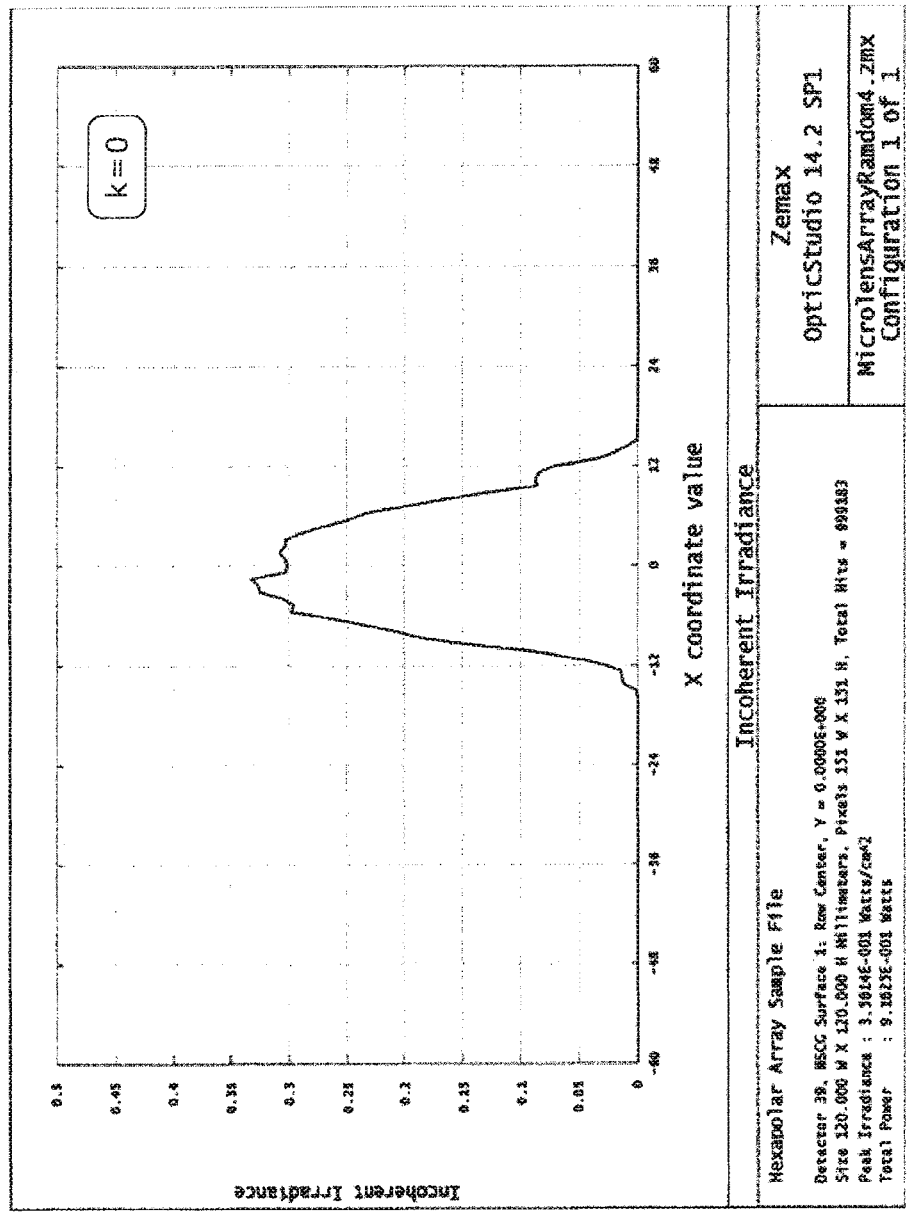
FIG. 9 is a graph that illustrates change of diffusion characteristics of a diffuser plate associated with change of a conic coefficient.
Figure 9:
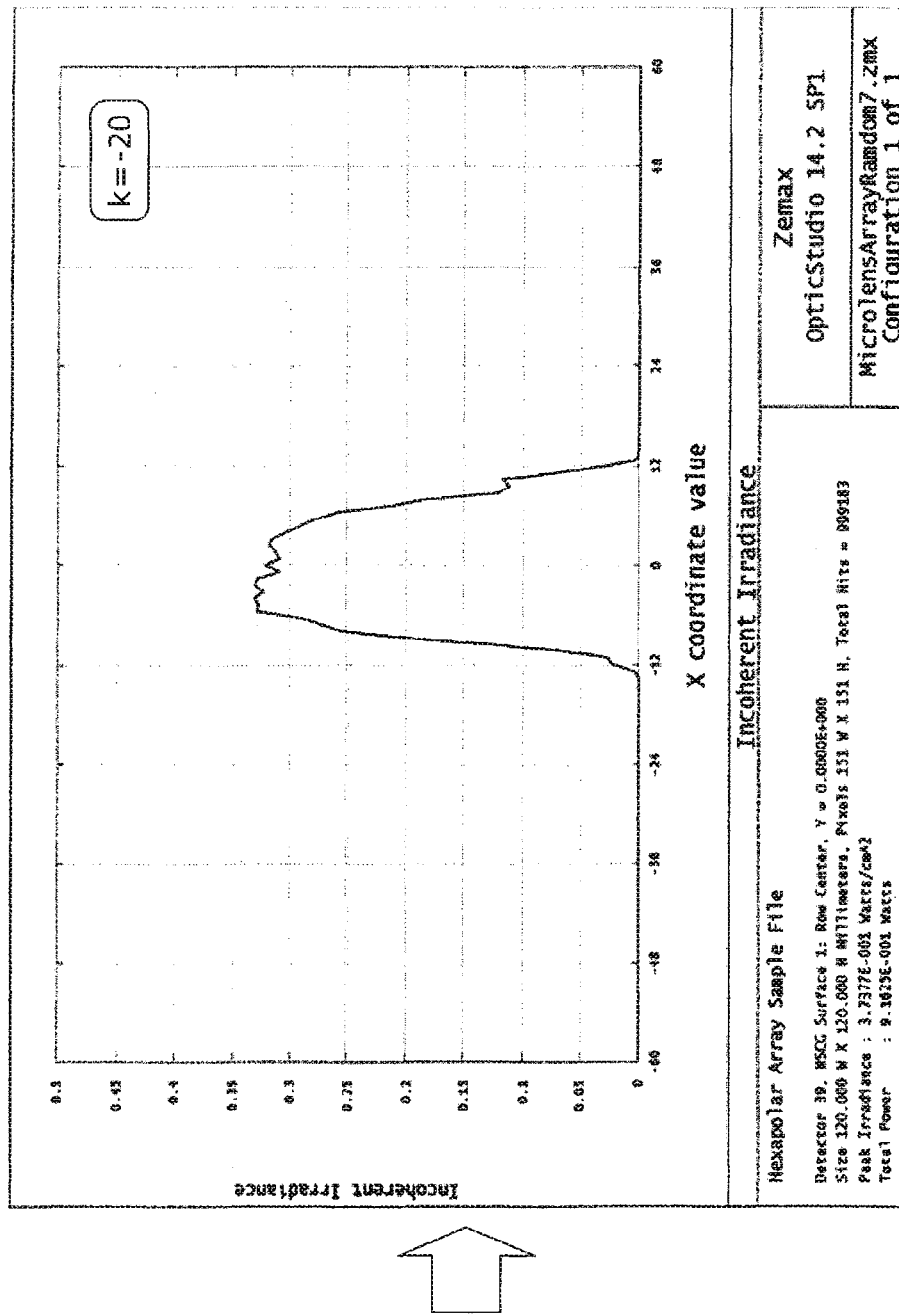
Figure 9:
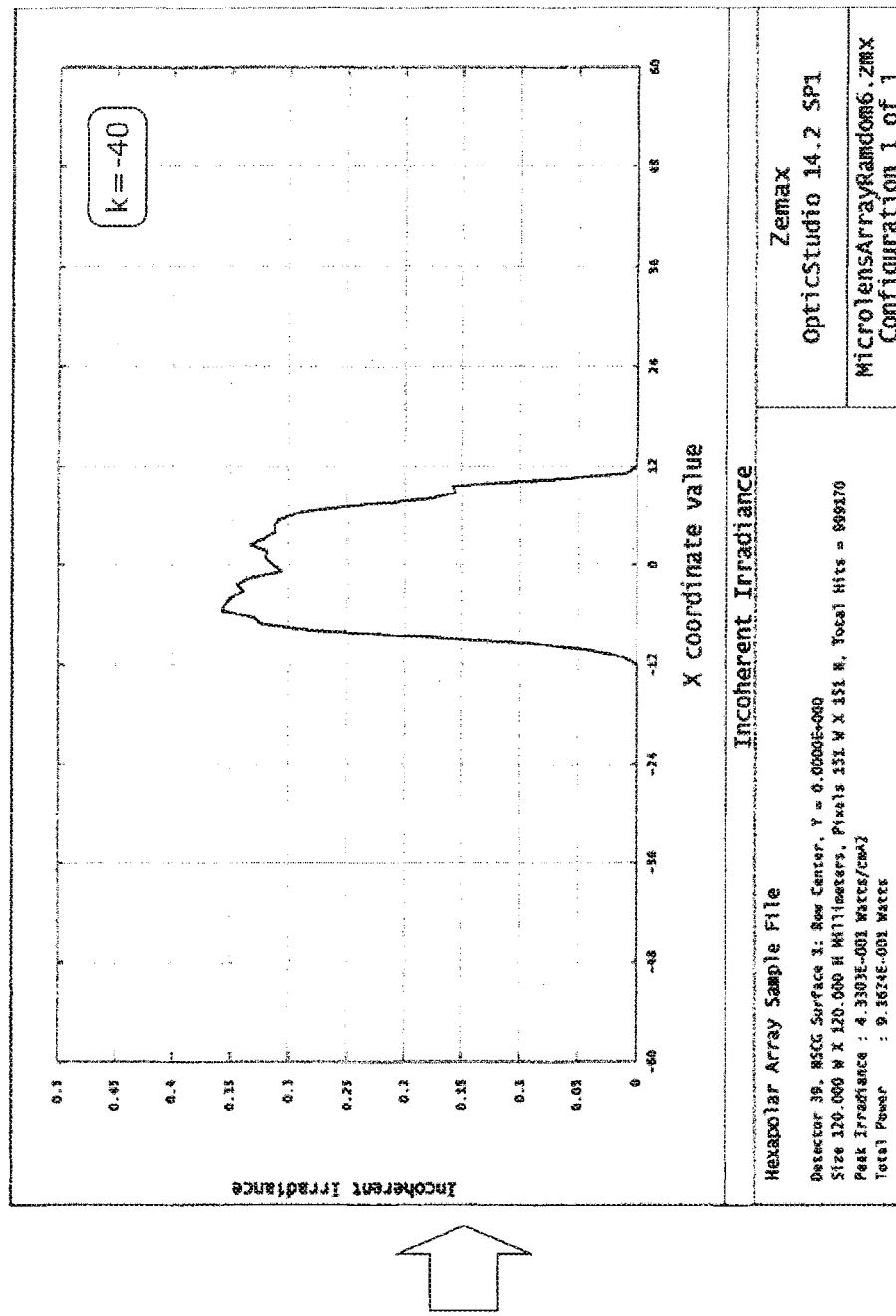
Figure 9:
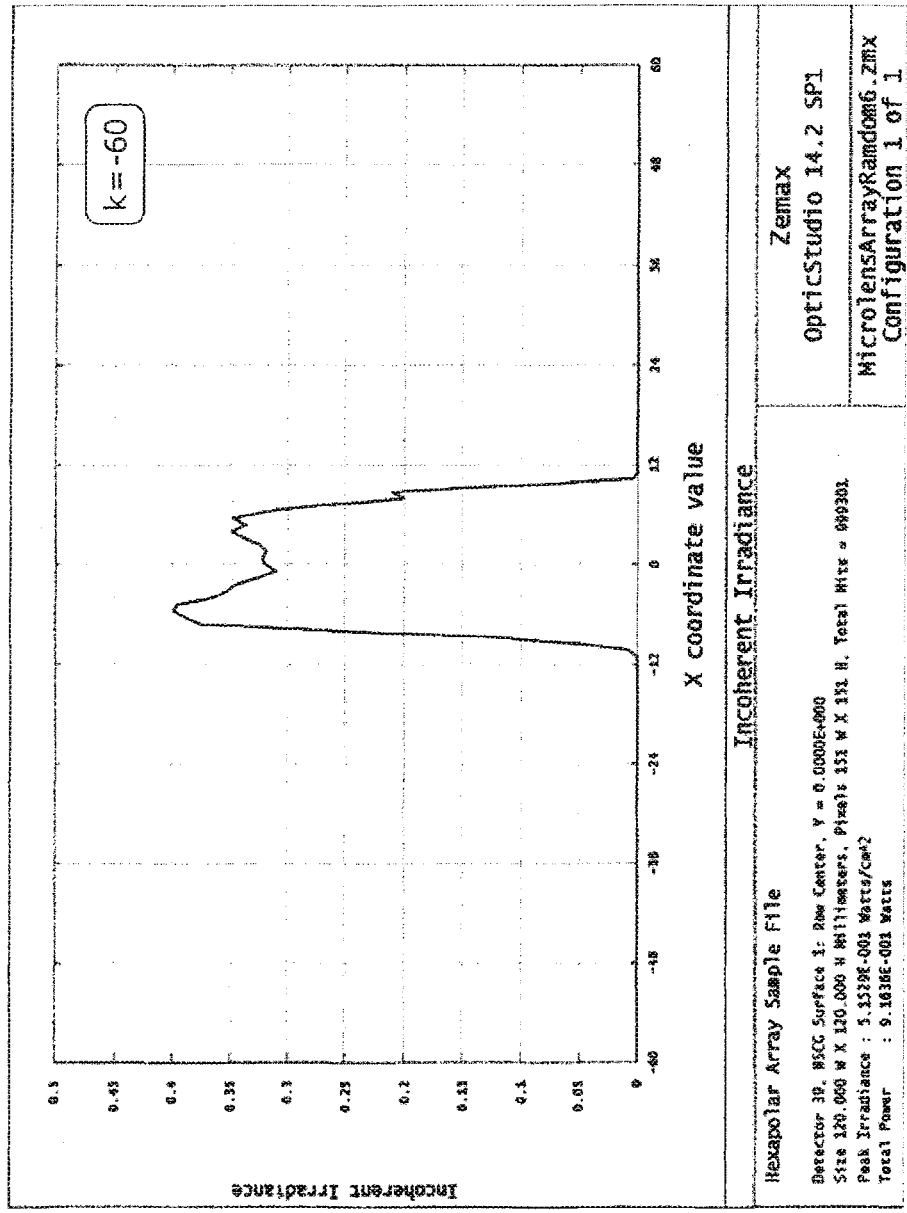
Figure 10A:
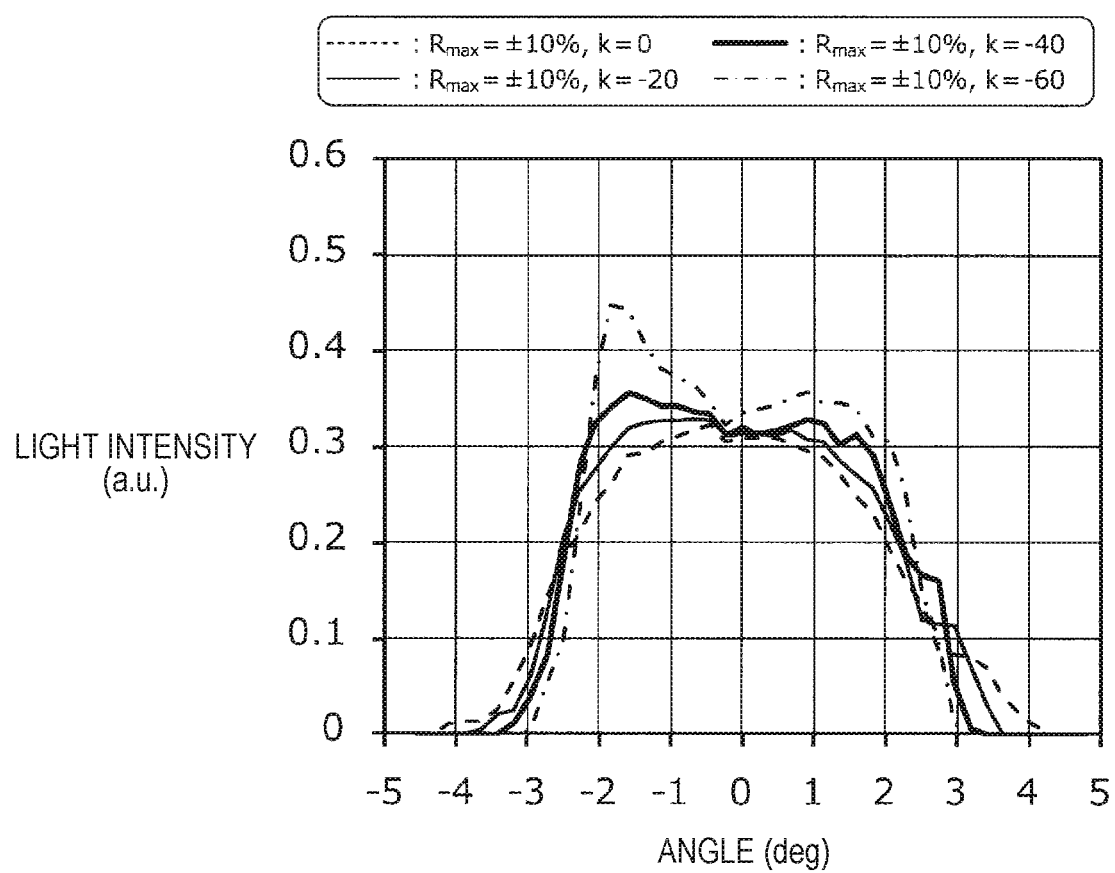
FIG. 10A is a graph that illustrates an example of diffusion angle distribution of light intensity in the case where a peak position, a curvature radius, and a conic coefficient of a single lens are changed.
Figure 10B:
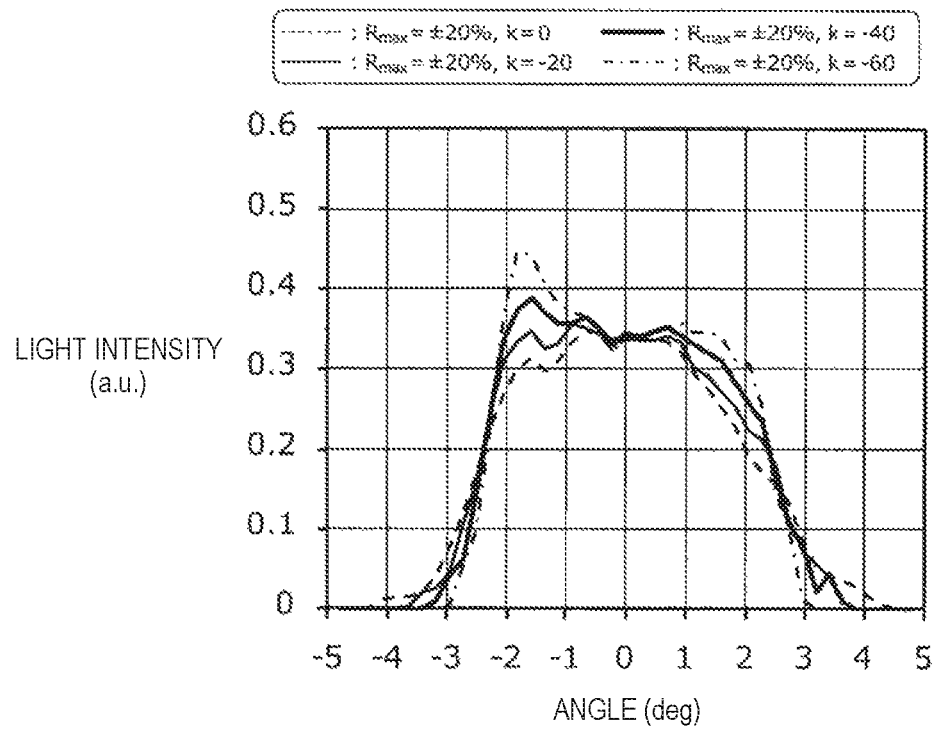
FIG. 10B is a graph that illustrates an example of diffusion angle distribution of light intensity in the case where a peak position, a curvature radius, and a conic coefficient of a single lens are changed.
Figure 11:
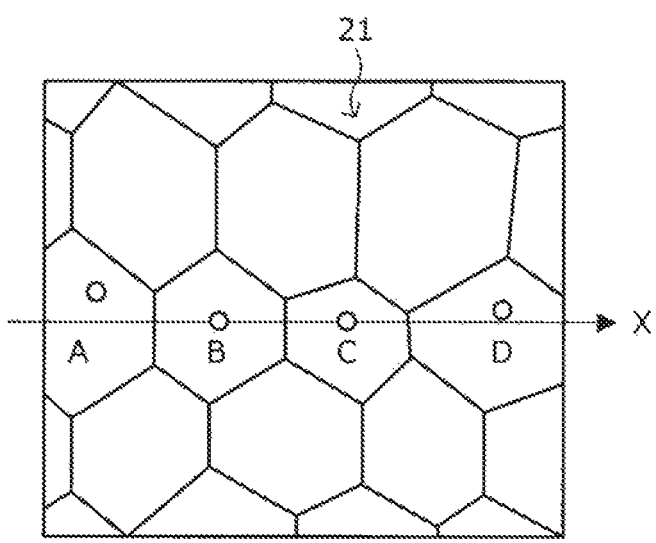
FIG. 11 is an explanatory diagram that schematically illustrates a relationship between peak positions in a single lens group.
Figure 12:
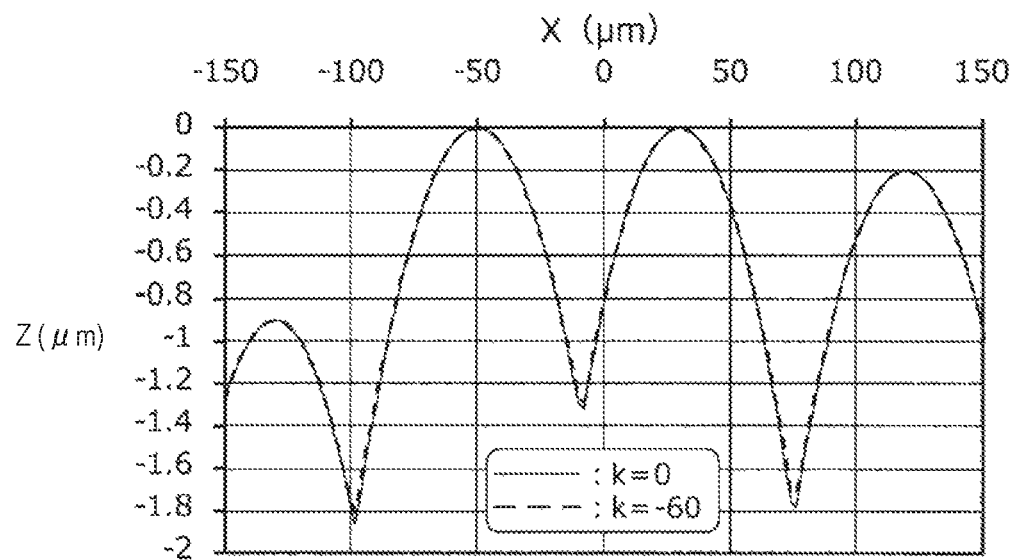
FIG. 12 is a graph that illustrates an example of a cross-sectional shape profile of a single lens group.
Figure 13:
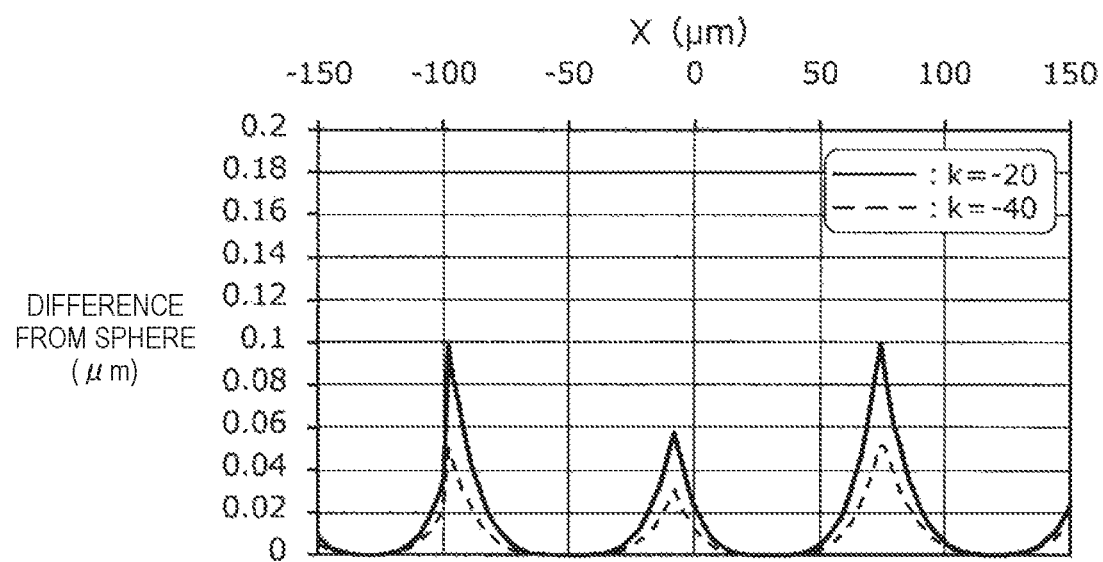
FIG. 13 is a graph that illustrates an example of a cross-sectional shape profile of a single lens group.
Figure 14A:
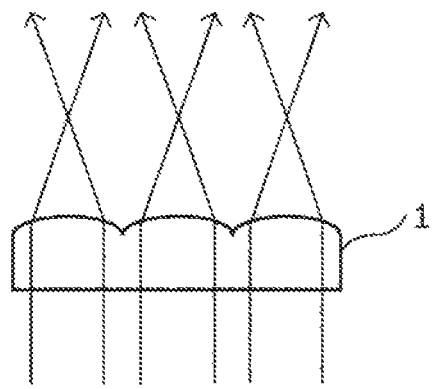
FIG. 14A is an explanatory diagram for describing a diffuser plate according to the embodiment.
Figure 14B:
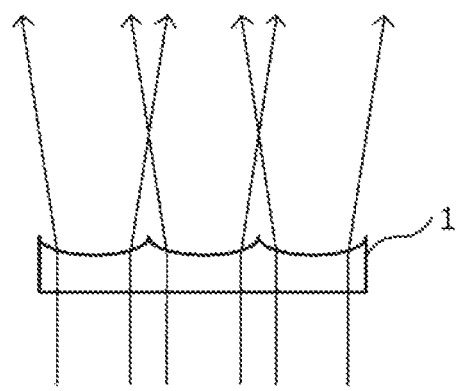
FIG. 14B is an explanatory diagram for describing a diffuser plate according to the embodiment.

FIG. 1 is an explanatory diagram that schematically illustrates the diffuser plate 1 according to the present embodiment, and is a top view and a side view of the diffuser plate 1 according to the present embodiment. FIG. 2 is an explanatory diagram for describing a surface shape function that expresses a surface shape of a lens. FIG. 3 is a graph that illustrates an example of a relationship between a conic coefficient and a surface shape of a lens, and FIG. 4 is a graph that illustrates an example of a relationship between a conic coefficient and diffusion characteristics of a lens. FIG. 5 is an explanatory diagram for describing peak positions of single lenses in a diffuser plate, and FIG. 6 is an explanatory diagram for describing a size of an outer diameter of a single lens, and FIG. 7 is an explanatory diagram for describing a shape of a boundary between adjacent single lenses. FIG. 8 is a graph that illustrates change of diffusion characteristics of a diffuser plate associated with variation of peak positions of single lenses and variation of curvature radii, and FIG. 9 is a graph that illustrates change of diffusion characteristics of a diffuser plate associated with change of a conic coefficient. FIGS. 10A and 10B are each a graph that illustrates an example of diffusion angle distribution of light intensity in the case where a peak position, a curvature radius, and a conic coefficient of a single lens are changed. FIG. 11 is an explanatory diagram that schematically illustrates a relationship between peak positions in the single lens group. FIGS. 12 and 13 are each a graph that illustrates an example of a cross-sectional shape profile of a single lens group. FIGS. 14A and 14B are each an explanatory diagram for describing a diffuser plates according to the present embodiment.

The diffuser plate 1 according to the present embodiment is a microlens array diffuser plate including a plurality of microlens (hereinafter, also referred to as "single lens") located on a substrate. Such a diffuser plate 1 includes, as schematically illustrated in FIG. 1, a transparent substrate 10 and a single lens group 20 formed on a surface of the transparent substrate 10.

<With Regard to Transparent Substrate 10>

The transparent substrate 10 is a substrate made of material that can be assumed as transparent in a wavelength band of light that enters into the diffuser plate 1 according to the present embodiment. Although the material of the substrate is not particularly limited, publicly known plastic may be used as the transparent substrate 10, and publicly known optical glass, such as quartz glass, borosilicate glass, and white plate glass, may also be used, for example. Although FIG. 1 illustrates an example in which the transparent substrate 10 is rectangular, the shape of the transparent substrate 10 is not limited to a rectangle, but may have an arbitrary shape, depending on the shape of a display device, a projection device, a lighting device, or the like in which the diffuser plate 1 is provided, for example.

<With Regard to Single Lens Group 20>

The single lens group 20 composed of a plurality of single lenses 21 is formed on the surface of the transparent substrate 10. In the diffuser plate 1 according to the present embodiment, the single lens group 20 is preferably formed in such a manner that a plurality of single lenses 21 are adjacent to each other (in other words, in such a manner that a gap (flat portion) does not exist between the single lenses 21) as schematically illustrated in FIG. 1. A component of incoming light that transmits through the diffuser plate surface as it is without scattering on the diffuser plate surface (hereinafter, also referred to as "0th order transmitted light component") can be reduced, by locating the single lenses 21 on the transparent substrate 10 without a gap (in other words, locating the single lenses 21 in such a manner that the filling rate of the single lenses is 100%). As a result, the single lens group 20 including a plurality of single lenses 21 located adjacent to each other can further improve diffusion capability.

Also, in the single lens group 20 according to the present embodiment, each single lens 21 is not located regularly, but is located irregularly (at random), as schematically illustrated in FIG. 1. Here, "irregular" means regularity relevant to the location of the single lens 21 does not exist practically, in an arbitrary region of the single lens group 20 in the diffuser plate 1. Thus, even if a certain kind of regularity exists in the location of the single lens 21 at a microscopic region in an arbitrary region, the arbitrary region having no regularity in the location of the single lens 21 as a whole is assumed to be included in "irregular". Note that an irregular locating method of the single lens 21 in the single lens group 20 according to the present embodiment will be described again in detail below.

A plurality of single lenses 21 are located adjacent to each other, and the single lenses 21 are formed irregularly on the transparent substrate 10, and thereby the outlines of the single lenses 21 are not the same shape as each other, but have various shapes as schematically illustrated in FIG. 1.

In the example illustrated in FIG. 1, the single lenses 21 that compose the single lens group 20 are convex lenses. The single lens group 20 according to the present embodiment includes an aspherical component in the surface shape of each single lens 21.

[With Regard to Change of Light Intensity Distribution Associated with Asphericity of Lens]

The surface shape of each single lens 21 and the location of a plurality of single lenses 21 according to the present embodiment are set on the basis of knowledge relevant to the asphericity of the lens described in detail below, and the irregularity of the curvature radius of the lens and the lens location. Thus, in the following, the surface shape of a widely-used lens will be described first, before describing the single lens group 20 and the single lens 21 according to the present embodiment in detail.

The surface shape of the widely-used lens is expressed by using a surface shape function that expresses the surface shape of the lens, like the following Equation 101.

[Math. 2]

$$z = \frac{cx^2}{1 + \sqrt{1 - (1+k)c^2x^2}} \quad \text{(Equation 101)}$$

Here, the coordinate system used in the surface shape function illustrated in the above Equation 101 will be described simply with reference to FIG. 2.

In the surface shape function illustrated in Equation 101, the optical axis direction of the lens that has the surface shape expressed by the surface shape function is Z axis direction. Also, as schematically illustrated in FIG. 2, the peak of the lens in the height direction (the position at which the lens height is maximum) is set as an origin O, and the plane that passes through this peak and is orthogonal to the optical axis direction (Z axis direction) of the lens is set as a reference plane. One of the spreading directions of this reference plane corresponds to X axis direction, and the X axis direction can be assumed as a radial direction of the lens.

In the above Equation 101, x corresponds to a separation distance from the lens optical axis (Z axis) as illustrated in FIG. 2, and z in the above Equation 101 corresponds to a difference of the height from the reference plane at position x as illustrated in FIG. 2. This difference of the height from the reference plane is also referred to as sag value. Also, c in the above Equation 101 is the curvature at the peak of the lens.

Also, the parameter k in the above Equation 101 is also referred to as conic coefficient, and is a parameter that specifies the surface shape of the lens. In the case where $k=0$, the surface shape (i.e., corresponding to the surface shape of the lens) of a rotating body obtained by rotating the surface shape function expressed by the above Equation 101 around the Z axis is a sphere that does not include an aspherical component. Also, in the case where $-1<k<0$, the surface shape of the lens is an ellipsoid, and in the case where $k=-1$, the surface shape of the lens is a paraboloid, and in the case where $k<-1$, the surface shape of the lens is a hyperboloid. That is, in the case where the value of the conic coefficient k is a negative value, the surface shape of the corresponding lens includes an aspherical component.

Although the curvature c of the lens included in the above Equation 101 is an inverse of the curvature radius r of the lens, the curvature radius r of the lens is given by the following Equation 103. Here, in the following Equation 103, f represents the focal length of the lens, and a represents the outer diameter of the lens, and θ represents the diffusion angle (half angle), and n is the refractive index of the material used in the lens.

[Math. 3]

$$r = f \cdot (n-1) = \frac{a}{2\tan\theta} \cdot (n-1) \quad \text{(Equation 103)}$$

Let us assume that the diffusion angle θ is 2.5°, the outer diameter a of the lens is 100 μm, and the refractive index n of the material used in the lens is 1.5, the curvature radius r calculated from the above Equation 103 is 570 μm. In this case, the relationship between the sag value z given by the above Equation 101 and the separation distance x is as illustrated in FIG. 3. FIG. 3 illustrates computation results in both of the case of the conic coefficient k=0 (sphere) and the case of k=−60 (hyperboloid).

As is obvious from FIG. 3, the curved surface becomes slightly flatter, in the case where the absolute value of the conic coefficient k is large. Also, in the case where the outer diameter a of the lens is 100 μm, the difference between the sag value z in the case of k=0 and the sag value z in the case of k=−60 is at the maximum near X=±60 μm, and is approximately 300 nm.

Next, simulation is performed with regard to the above two conditions, by using Zemax which is a publicly known light beam tracking simulator, in order to confirm how the diffusion angle characteristics of the lens change, due to the difference of the lens shape by the conic coefficient. This simulation verifies angle distribution of intensity of outgoing light, in the case where the light having the uniform intensity distribution enters one lens. The result obtained by this simulation is illustrated in FIG. 4. Note that FIG. 4 illustrates one-dimensional distribution in a radial direction (X direction), for simplicity.

In FIG. 4, the horizontal axis is the angle of the outgoing light (i.e., diffusion angle) in the case where the optical axis direction (Z axis direction) of the lens is set to 0°, and the vertical axis is the intensity of the outgoing light. As is obvious from FIG. 4, in the case where the conic coefficient k is 0, and the surface shape of the lens is a sphere, the intensity of the outgoing light is approximately constant within a range of the diffusion angle from −2° to 2°, and what is called a top-hat light intensity distribution, in which the intensity distribution of the outgoing light becomes substantially flat within a predetermined diffusion angle range centered at the optical axis, is achieved. Also, in the case where the conic coefficient k is −60, peaks of the light intensity exist near the diffusion angles ±2° respectively, and the light intensity is at a local minimum near the diffusion angle 0°, so as to form what is called bimodal distribution. Thus, in the case of the conic coefficient k=−60, the distribution of the light intensity in the reference plane illustrated in FIG. 2 has a circular ring shape.

As is obvious from this result, when the aspherical component having the conic coefficient k<0 is added to the spherical surface shape of the widely-used lens, the circular ring light intensity distribution with greater light intensity at the periphery portion of the lens is achieved.

[With Regard to Change of Light Intensity Distribution Associated with Irregularity of Curvature Radius of Lens and Lens Location]

Next, influence of the irregularity of the curvature radius of the lens and the lens location on the light intensity distribution will be considered. In the following, a microlens array provided with a plurality of spherical lenses having the conic coefficient k=0 will be focused.

The behavior of the diffusion of the light that has entered into the microlens array is overlap of the diffused light from a large number of single lenses, and thus if the shapes of all the single lenses are the same, the relationship between the lens shape and the diffusion intensity distribution illustrated in FIG. 4 is established as it is. On the other hand, in order to reduce the high-order diffraction component mentioned previously, the locations and the curvature radii of the lenses are preferably set variously, so as to differentiate the shapes, the arrangement, and the like of all the single lenses.

In the following, a method for achieving the irregularity relevant to the lens location will be described specifically with reference to FIGS. 5 and 6.

First, the lens location having regularity, which is the basis of the lens location having irregularity, is focused. Such lens location having regularity includes square location in which the peak positions of the single lenses are located squarely, hexagonal location in which the peak positions of the single lenses are located at the positions corresponding to the vertices of a regular hexagon and the center of the regular hexagon, or the like. FIG. 5 illustrates the peak positions of the single lenses located hexagonally, with black circles as reference lens locations. In addition, the peak positions of the single lenses are shifted at random, within a range of radius Δr from the positions of initial values at the peak positions of the regular single lenses. According to this locating method, two irregularities are introduced into the shift direction of the peak positions of the single lenses from the reference positions and the shift amounts of the peak positions of the single lenses from the reference positions. Here, the allowable shift direction is all directions with respect to the center at the reference positions, and the shift amount is selected arbitrarily within a range of $0 < |\Delta r| \leq |\Delta r_{max}|$, by specifying the maximum shift amount $|\Delta r_{max}|$. Such irregularity is applied to all the single lenses that compose the microlens array. By introducing such irregularity into the microlens array, the interval of each single lens (i.e., the distance between the peak positions adjacent to each other, and the distance indicated by p in FIG. 5) is set within a certain range. As a result, the collected diffusion light flux from each single lens is set within a certain range.

Analysis is performed to a case in which the light of uniform intensity distribution enters into the microlens array into which the irregularity is introduced as described above, by utilizing a commercially available light beam tracking simulation application.

Note that, in the simulation, a single lens having the refractive index n=1.5, the conic coefficient k=0, the lens outer diameter a=100 μm, and the curvature radius r=570 μm is focused, and a microlens array in which such single lenses are located without a gap is used as a model. Here, the above $|\Delta r_{max}|$ is set to three types: 20 μm, 40 μm, and 50 μm to irregularly locate the respective single lenses, and each of the cases is simulated. Also, in the simulation, the curvature radius r itself of the single lens is also varied, so that the maximum value $R_{max}$ in the variation of the curvature radius is ±10%. That is, in the present simulation, the single lenses that compose the microlens array have curvature radii each having a value from (570 μm−10%=513 μm) to (570 μm+10%=627 μm) at random. Although the outline of the single lens is not a regular polygon in the case where the locations of the single lenses are made irregular, the outer diameter a of the lens in this case can be handled as a diameter of a circumscribed circle that circumscribes the single lens, as illustrated in FIG. 6.

The curvature radii r themselves of the single lenses are varied, and thereby the curvature radii of the adjacent single lenses differ from each other in many cases. As a result, as schematically illustrated in FIG. 7, the curvature radius is $r_A$ in a single lens A, whereas the curvature radius is $R_B$ ($\neq r_A$) in a single lens B, in many cases.

In the case where the curvature radii of the adjacent single lenses differ, the boundary between the adjacent single lenses is not configured with only a straight line, but includes a curving line at at least its part. The curving line is included at at least a part of the boundary between the single lenses, and thereby the regularity of the location further breaks down at the boundary between the single lenses, and consequently the diffraction component is further reduced.

The result obtained by the above simulation is summarized in FIG. 8. In FIG. 8, the horizontal axis is X coordinate illustrated in FIG. 2, and the vertical axis is the intensity (unit: a.u.) of the light that has transmitted through the microlens array. In this simulation, the maximum value $R_{max}$ of the variation of the curvature radius is common in the three cases, and thus the difference between the diffusion characteristics in the three simulation results illustrated in FIG. 8 is considered to result from the degree of variation (i.e., Δr) of the locations of the single lenses. As is obvious from FIG. 8, as the irregularity (i.e., the size of $|\Delta r_{max}|$) of the locations of the lenses increases in the order of 20 μm→40 μm→50 μm, the diffusion characteristics shift from bimodality in which two peaks exist in the periphery portion to monomodality in which one peak exists near X=0°. This result shows a fact that the diffusion characteristics from the individual single lenses are varied, and consequently the diffusion characteristics of the entire overlapped microlens array become monomodal.

[With Regard to Lens Shape and Lens Location in Single Lens Group 20]

In the above, the following knowledge is obtained from the consideration result illustrated in FIGS. 3 to 8. That is, the high-order diffraction component is reduced by giving the variation to the locations of the single lenses that compose the microlens array, and the curvature radii of the single lenses, in the microlens array as a whole. On the other hand, in the diffusion characteristics, the intensity of the diffusion center (i.e., near the diffusion angle 0°) increases, and the diffusion characteristics change from what is called top-hat shape to monomodality. Also, by adding the aspherical component to the surface shapes of the single lenses that compose the microlens array, the intensity of the periphery portion (part of a large absolute value of the diffusion angle) of the diffusion characteristics increases, and the entire microlens array exhibits the bimodal diffusion characteristics.

On the basis of the above knowledge, the present inventor has conceived of giving the variation to the locations and the curvature radii of the single lenses that compose the microlens array in order to reduce the degradation of the diffusion characteristics due to the high-order diffraction component, which is unable to be ignored in a comparatively small diffusion angle of 30° or less for example, as well as compensating for monomodality of the diffusion characteristics caused by the variation, with bimodality of the diffusion characteristics by adding the aspherical component in the surface shapes of the single lenses. Thereby, the reduction of the high-order diffraction component and the achievement of the flat diffusion angle distribution characteristics are simultaneously performed, which has been difficult in the past.

In order to study the above knowledge, the present inventor has verified the diffusion characteristics, under a simulation condition illustrated in the lowermost part of FIG. 8 as a common condition, by performing simulation while adding the aspherical component to each single lens that composes the microlens array. Here, the value of the conic coefficient k is four types including 0 (the same condition as the lowermost part of FIG. 8), −20, −40, and −60, and is the same in each single lens. That is, in the simulation with the conic coefficient k=−20, all the single lenses have the conic coefficient k=−20.

The obtained result is summarized in FIG. 9. In FIG. 9, the horizontal axis is X coordinate illustrated in FIG. 2, and the vertical axis is the intensity (unit: a.u.) of the light that has transmitted through the microlens array. As is obvious from FIG. 9, as the absolute value of the conic coefficient k becomes larger, the intensity of the periphery portion of the lens becomes larger, and the outline of the intensity distribution indicating the diffusion characteristics changes from monomodality (k=0) to a substantially flat shape (k=−20 to −40), and further changes to bimodality (k=−60). Such behavior is similar to the simulation result of the single lenses to which the irregularity is not introduced, as illustrated in FIG. 4.

From the result illustrated in FIG. 9, it is envisaged that the reduction of the high-order diffraction component and the achievement of the flat diffusion angle distribution characteristics are performed simultaneously, by setting the value of the conic coefficient k within an appropriate range. Thus, the present inventor has decided to confirm the range of the conic coefficient k, by simulation.

In this simulation, the single lens group 20, which is the microlens array that functions as the diffuser plate, is configured with the following plurality of single lenses 21. That is, a model is created by considering hexagonal location in which the peak interval (the distance between the black circles in FIG. 5) is 100 μm at the peak positions located regularly, and setting the peak positions of the single lenses 21 within a predetermined range ($\Delta r_{max}$=50 μm) from the peak positions of the hexagonal location. The lens material of the single lens 21 is assumed to be an optical glass having a refractive index n=1.5. The average pitch between the single lenses (the average value of the pitch p between the single lenses in the entire single lens group 20 in FIG. 5) is set to 100 μm, and the diffusion angle is set to ±2.5°. In the case where the parameters of the single lens 21 are set as described above, the curvature radius r is 570 μm, from the above Equation 103. Thus, the present simulation assumes two cases in which the curvature radius r=570 μm is the average value: the case where the variation $R_{max}$ of the curvature radius is ±10%; and the case where the variation $R_{max}$ of the curvature radius is ±20%. Also, the size of the light that enters into the single lens group 20 is set to φ600 μm. Under such setting, the analysis is performed by utilizing a commercially available light beam tracking simulation application.

The obtained result is illustrated in FIGS. 10A and 10B. FIG. 10A is a result obtained in the case where the maximum value $R_{max}$ of the variation of the curvature radius is ±10%, and FIG. 10B is a result obtained in the case where the maximum value $R_{max}$ of the variation of the curvature radius is ±20%. Also, in FIGS. 10A and 10B, the horizontal axis is the diffusion angle (half angle), and the vertical axis is the intensity of the diffused light. Also, the light intensity distribution indicating the diffusion characteristics is substantially symmetrical in the radial direction of the lens, and thus FIGS. 10A and 10B illustrate the distribution in only one-dimensional direction (X axis direction in FIG. 2) for simplicity.

In both of FIGS. 10A and 10B, in the case of the conic coefficient k=0, the light intensity distribution indicating the diffusion characteristics is the monomodal distribution, and in the case of the conic coefficient k=−60, the light intensity distribution is the bimodal distribution (circular ring shape in the three-dimensional distribution). Also, in the case where the conic coefficient k is within the range of −40≤k≤−20, substantially flat light intensity distribution is obtained.

From this result, in the shape of the single lens 21 in the above model, the value of the conic coefficient k is set within the range of −40≤k≤−20, and thereby the reduction of the high-order diffraction component and the achievement of the flat diffusion angle distribution characteristics are performed simultaneously.

Note that the above range of the conic coefficient k changes depending on the curvature radius of the single lens 21 and the flat angle range (the range of ±2.5° in the case of FIGS. 10A and 10B). However, in consideration of the fact that mutually similar lens surface shapes exhibit the same diffusion characteristics, a similar relationship is established by multiplying each of the size X of the lens in the radial direction, the height Z of the lens, the curvature radius r (=1/c) by A in the above Equation 101, and in this case the value of the conic coefficient k becomes an invariant value.

Thus, in the single lens 21 according to the present embodiment, the value of the conic coefficient k is set within the range expressed by the following Equation 105, in order to introduce the aspherical component to the single lenses 21 that compose the single lens group 20. Note that, as obvious from the value of the conic coefficient expressed by Equation 105, the surface shapes of the single lenses 21 according to the present embodiment are hyperboloid. Note that the value of the conic coefficient in the single lenses 21 according to the present embodiment is preferably −35≤k≤−25, and more preferably −33≤k≤−27.

[Math. 4]

$$-40 \leq k \leq -20 \tag{Equation 105}$$

Here, in order to illustrate the relationship between the above conic coefficient k and the surface shape of the single lens 21 more specifically, a part of a specific cross-sectional profile in the model used in the above simulation is illustrated. A top view of a part of the single lens group 20 in the above model is schematically illustrated as in FIG. 11. Note that, in FIG. 11, the boundaries between the adjacent single lenses are illustrated with straight lines for convenience in creating the drawing, but the actual model shape includes curving lines at parts of the boundaries.

Each single lens 21 from a single lens A to a single lens D in the model illustrated in FIG. 11 includes irregularity in its location, and thus the peak position (the position at which the height Z is maximum) in each single lens is not aligned on one straight line. In the following, the plane obtained by linking the peak positions of the respective single lenses A to D illustrated in FIG. 11 is set as the reference plane, and the straight line obtained by linking the peak position of the single lens B and the peak position of the single lens C is set as the X axis.

FIG. 12 illustrates cross-sectional profiles obtained in both of the case in which the conic coefficient k is 0 and the case in which the conic coefficient k is −60. In the single lens A and the single lens D, the position of the X axis is misaligned from the peak position in each single lens, and thus the Z value of the peak is not zero. As is obvious from FIG. 12, there is a larger influence of the conic coefficient k, near the boundary between the single lenses adjacent to each other.

FIG. 13 is obtained by calculating the difference from the sag value z in the sphere shape in the case in which the reference plane and the X axis are set similarly to FIG. 12, and in the both cases in which the conic coefficient k is −20 and the conic coefficient k is −40. In the case where the conic coefficient k is within the range of −40≤k≤−20, the difference of the sag value z from the sphere shape having the conic coefficient k=0 reaches 100 nm at the maximum, as is obvious from FIG. 13. Note that the maximum value of the difference of the sag value z from the sphere shape illustrated in FIG. 13 changes depending on the curvature radius of the single lens and the pitch between the single lenses. Also, it is conceived that a curved surface is formed near the actual single lens boundary due to restriction on single lens manufacturing, and the maximum value of the sag value z is "rounded" because of such restriction on manufacturing. In consideration of such "rounding", the difference of the sag value z that corresponds to the range −40≤k≤−20 of the conic coefficient k is considered to be approximately 30 nm to 100 nm.

Note that, in the single lens group 20 according to the present embodiment, it is preferable to set the maximum shift amount $\Delta r_{max}$ from the regular peak position of the peak position of each single lens 21, which is illustrated in FIG. 5, to an approximately half of the pitch between the single lenses. Specifically, the maximum shift amount $\Delta r_{max}$ is preferably over 0 μm to approximately 50 μm, more preferably approximately 30 μm to 50 μm, and still more preferably approximately 40 μm to 50 μm. By setting the maximum shift amount $\Delta r_{max}$ of the peak position of each single lens 21 within the above range, the diffusion characteristics of the diffuser plate including the single lens group 20 is made substantially flat more certainly.

Also, in the single lens group 20 according to the present embodiment, in the case where the diameter of the circumscribed circle of each single lens 21 illustrated in FIG. 6 is set to a, it is preferable to set the shift amount Δr from the regular peak position of the peak position of each single lens 21 so as to satisfy Δr/a≠0. Locating each single lens 21 to satisfy such a condition means shifting the peak positions of all the single lenses 21 from the regular peak positions. In this way, irregularity is introduced more certainly, with regard to the locations of the single lenses 21 in the single lens group 20.

Further, in the single lens group 20 according to the present embodiment, it is preferable that the average pitch between the single lenses 21 be set such that the sag value corresponding to the height of the single lens 21 is approximately 1 μm to 5 μm. Specifically, the average pitch between the single lenses 21 is preferably approximately 30 μm to 100 μm, and more preferably approximately 70 μm to 100 μm. The average pitch between the single lenses 21 is set within the above range, and thereby difficulty in manufacturing resulting from too small sag value is prevented, and even in the case where the size of the incoming light is small, the variation of the diffusion characteristics due to the entering position is reduced.

Also, in the single lens 21 according to the present embodiment, the maximum value $R_{max}$ of the variation of the curvature radius is preferably ±20%, and more preferably to ±10%. The variation $R_{max}$ of the curvature radius of the single lens 21 is set within the above range, and thereby the diffusion characteristics of the diffuser plate configured with the single lenses 21 is made substantially flat more certainly.

Note that, in the single lens group 20 according to the present embodiment, it is preferable that a plurality of single lenses 21 be formed adjacent to each other (in other words, a gap does not exist between the single lenses 21), as mentioned previously. Thus, in the single lens group 20 according to the present embodiment, it is preferable that the curvature radius r of the single lens 21 be made larger than the maximum value of the pitch between the single lenses in the single lens group 20, and, when considering a circumscribed circle that circumscribes the single lens 21, the minimum value of the diameter a of the circumscribed circle in the single lens group 20 is made larger than the maximum value of the pitch between the single lenses. The curvature radius r and the diameter a of the circumscribed circle have the relationship with the maximum value of the pitch between the single lenses as described above, and thereby even in the case where the diffuser plate 1 of comparatively small diffusion angle is configured, the single lenses 21 are located without a gap more certainly. Thereby, in the single lens group 20 according to the present embodiment, the 0th order transmitted light is reduced.

In the diffuser plate 1 according to the present embodiment, the single lens group 20 described above is formed on the transparent substrate 10, and thereby even in the case where the diffusion angle is a comparatively small diffusion angle of 30° or less in total angle for example, the high-order diffraction component is reduced, and the flat diffusion angle distribution characteristics are achieved. Note that the diffusion angle in the diffuser plate 1 according to the present embodiment is not limited particularly, and may be, for example, 20° or less in total angle, or 10° or less. As is obvious from the above description, even in the case where the diffusion angle (total angle) is extremely small and is approximately 5°, the reduction of the high-order diffraction component and the achievement of the flat diffusion angle distribution characteristics are performed simultaneously, and thus also in a larger diffusion angle, the reduction of the high-order diffraction component and the achievement of the flat diffusion angle distribution characteristics are performed simultaneously, by forming the single lens group 20 on the basis of a design guideline similar to the above.

In the above, the single lens group 20 according to the present embodiment has been described in detail, with reference to FIGS. 2 to 13.

Note that the above description has taken an example in which the shape of the single lens 21 is convex in the upward direction (i.e., in the case of a convex lens microlens array) as illustrated in FIG. 14A. However, even in the case where the shape of the single lens 21 is convex in the downward direction (i.e., in the case of a concave lens microlens array) as illustrated in FIG. 14B, only difference is that the position of the focal point is positioned inside of the transparent substrate 10, and a similar function to the case of being convex in the upward direction is obtained. Thus, also in the concave lens microlens array, the discussion regarding the above flat diffusion characteristics and aspherical shape can be handled similarly.

In the above, the diffuser plate 1 according to the present embodiment has been described in detail, with reference to FIGS. 1 to 14B.

Note that the diffuser plate 1 according to the present embodiment described above is provided as appropriate in a device that needs to diffuse the light to provide its function. The device that needs to diffuse the light to provide the function is a display device such as a display, a projection device such as a projector, various types of lighting devices, and the like, for example. Also, the device that needs to diffuse the light to provide the function is not limited to the above examples, and the diffuser plate 1 according to the present embodiment can be applied to other publicly known devices, as long as it is a device that utilizes diffusion of light.

(With Regard to Method of Manufacturing Diffuser Plate)

Next, an example of a method of manufacturing the diffuser plate 1 according to the present embodiment described above will be described simply. The diffuser plate 1 according to the present embodiment can be manufactured by using the following method, for example.

First, through a publicly known process of applying photoresist to a predetermined glass substrate, and light exposure to image development, a replica of the surface shapes of the single lenses 21 in the single lens group 20 is created by resist. Here, the light exposure process is controlled in such a manner that the light exposure amount is proportional to the height Z of the single lens 21 in the case where the photoresist to be used is a negative type, and the light exposure amount is inversely proportional to the height Z in the case where the photoresist to be used is a positive type.

Note that, in patterning for forming a curved surface like the single lenses 21 according to the present embodiment, various types of methods, such as multiple exposure by overlaid grayscale mask and a plurality of photomasks and scan light exposure by laser lithography, can be applied.

Subsequently, reactive ion etching is performed by using the created replica as an etching mask, for example. Here, the etching selectivity between the transparent substrate 10 to be used and the resist is set to 1:1, and thereby the surface shape of the transparent substrate 10 after the etching is formed substantially same as the surface shape of the resist.

With the above processes, the diffuser plate 1 according to the present embodiment is manufactured. In the above, the method of manufacturing the diffuser plate 1 according to the present embodiment has been described simply.

EXAMPLE

Next, the diffuser plate according to the present invention will be described specifically, with Examples and Comparative Examples. Note that the Examples described below are just an example of the diffuser plate according to the present invention, and the diffuser plate according to the present invention is not limited to the following examples.

Test Example

The microlens array diffuser plate 1 is created by using a borosilicate glass substrate as the transparent substrate 10 and forming the single lens group 20 of the convex shape on the borosilicate glass substrate in accordance with the above manufacturing method. Influence on the diffusion characteristics by the conic coefficient k, the variation of the curvature radius $R_{max}$, and the variation of the peak position $\Delta r_{max}$ of the single lens from the regular peak position (hereinafter, simply referred to as "variation of the peak position") is confirmed by utilizing the created diffuser plate 1.

Note that a common condition in the following Examples and Comparative Examples are: the curvature radius r=570

µm; the refractive index n=1.5 of the glass substrate; and the pitch p between the single lenses=100 µm.

Example 1

The single lens group 20 is formed, by setting the conic coefficient k=−20, the variation of the curvature radius $R_{max}=\pm10\%$, and the variation of the peak position $\Delta r_{max}=50$ µm.

Example 2

The single lens group 20 is formed, by setting the conic coefficient k=−40, the variation of the curvature radius $R_{max}=\pm10\%$, and the variation of the peak position $\Delta r_{max}=50$ µm.

Example 3

The single lens group 20 is formed, by setting the conic coefficient k=−20, the variation of the curvature radius $R_{max}=\pm20\%$, and the variation of the peak position $\Delta r_{max}=50$ µm.

Example 4

The single lens group 20 is formed, by setting the conic coefficient k=−40, the variation of the curvature radius $R_{max}=\pm20\%$, and the variation of the peak position $\Delta r_{max}=50$ µm.

Comparative Example 1

The single lens group is formed, by setting the conic coefficient k=0, the variation of the curvature radius $R_{max}=\pm10\%$, and the variation of the peak position $\Delta r_{max}=20$ µm.

Comparative Example 2

The single lens group is formed, by setting the conic coefficient k=0, the variation of the curvature radius $R_{max}=\pm10\%$, and the variation of the peak position $\Delta r_{max}=40$ µm.

Comparative Example 3

The single lens group is formed, by setting the conic coefficient k=0, the variation of the curvature radius $R_{max}=\pm10\%$, and the variation of the peak position $\Delta r_{max}=50$ µm.

Comparative Example 4

The single lens group is formed, by setting the conic coefficient k=0, the variation of the curvature radius $R_{max}=\pm20\%$, and the variation of the peak position $\Delta r_{max}=50$ µm.

Comparative Example 5

The single lens group is formed, by setting the conic coefficient k=−60, the variation of the curvature radius $R_{max}=\pm10\%$, and the variation of the peak position $\Delta r_{max}=50$ µm.

Comparative Example 6

The single lens group is formed, by setting the conic coefficient k=−60, the variation of the curvature radius $R_{max}=\pm20\%$, and the variation of the peak position $\Delta r_{max}=50$ µm.

(Evaluation Method)

The light intensity distribution is measured by a goniophotometer, by causing blue laser light of a substantially Gaussian shape to enter into each diffuser plate created as described above. A graph indicating the diffusion characteristics, in which the horizontal axis is the diffusion angle, and the vertical axis is the transmitted light intensity (i.e., diffusion intensity), is created, and the diffusion intensity shape of the graph indicating the obtained diffusion characteristics is evaluated.

Note that the graph indicating the diffusion characteristics classifies the shape in a predetermined diffusion angle range into three types: "flat", "monomodal", and "bimodal (circular ring)", and the obtained result is summarized in the following Table 1.

Note that the evaluation criteria of the above three classification are as described below.

Flat: the ripple in the graph indicating the diffusion characteristics is 20% or less of the maximum intensity value Monomodality: the ripple does not exist in the graph indicating the diffusion characteristics Bimodality (circular ring): the ripple in the graph indicating the diffusion characteristics is 20% or more of the maximum intensity value

TABLE 1

Evaluation Result

| | Conic coefficient k | Variation of curvature radius $R_{max}$ (%) | Variation of peak position $\Delta r_{max}$ (µm) | Diffusion intensity shape |
|---|---|---|---|---|
| Example 1 | −20 | ±10 | 50 | Flat |
| Example 2 | −40 | ±10 | 50 | Flat |
| Example 3 | −20 | ±20 | 50 | Flat |
| Example 4 | −40 | ±20 | 50 | Flat |
| Comparative Example 1 | 0 | ±10 | 20 | Bimodal (circular ring) |
| Comparative Example 2 | 0 | ±10 | 40 | Bimodal (circular ring) |
| Comparative Example 3 | 0 | ±10 | 50 | Monomodal |
| Comparative Example 4 | 0 | ±20 | 50 | Monomodal |
| Comparative Example 5 | −60 | ±10 | 50 | Bimodal (circular ring) |
| Comparative Example 6 | −60 | ±20 | 50 | Bimodal (circular ring) |

(Detail of Evaluation Result)

Example 1

The diffusion intensity shape of the diffuser plate of Example 1 is a flat shape as illustrated in FIG. 10A, within the diffusion angle of ±2.5°, so that the high-order diffraction component is reduced, and the flat diffusion angle distribution characteristics are achieved.

Example 2

In Example 2 that increases the aspherical component of the diffuser plate according to Example 1 to k=−40, the diffusion intensity shape is a flat shape as illustrated in FIG. 10A within the diffusion angle of ±2.5°, so that the high-order diffraction component is reduced, and the flat diffusion angle distribution characteristics are achieved.

Example 3

In Example 3 that increases the variation of the curvature radius of the diffuser plate according to Example 1 to ±20%, the diffusion intensity shape is the flat shape as illustrated in FIG. 10B within the diffusion angle of ±2.5°, so that the high-order diffraction component is reduced, and the flat diffusion angle distribution characteristics are achieved.

Example 4

In Example 4 that increases the variation of the curvature radius of the diffuser plate according to Example 2 to ±20%, the diffusion intensity shape is the flat shape as illustrated in FIG. 10B within the diffusion angle of ±2.5°, so that the high-order diffraction component is reduced, and the flat diffusion angle distribution characteristics are achieved.

Comparative Example 1

In Comparative Example 1 having variation in the curvature radius in the single lens group that employs the spherical lenses and having smaller variation of the peak position than the variation in Example 1, the diffusion intensity shape has a bimodal shape (a circular ring, three-dimensionally) as illustrated in the uppermost part of FIG. 8, and the flat diffusion angle distribution characteristics are not achieved.

Comparative Example 2

In Comparative Example 2 that increases the variation of the peak position in Comparative Example 1 to 40 μm, the diffusion intensity shape is a bimodal shape (a circular ring, three-dimensionally) as illustrated in the middle part of FIG. 8, and the flat diffusion angle distribution characteristics are not achieved.

Comparative Example 3

In Comparative Example 3 that increases the variation of the peak position in Comparative Example 1 to 50 μm, the diffusion intensity shape is a monomodal shape as illustrated in the lowermost part of FIG. 8, and the flat diffusion angle distribution characteristics are not achieved.

Comparative Example 4

In Comparative Example 4 that increases the variation of the curvature radius in Comparative Example 3 to ±20%, the diffusion intensity shape is a monomodal shape as illustrated in FIG. 10B, and the flat diffusion angle distribution characteristics are not achieved.

Comparative Example 5

In Comparative Example 5 that increases the aspherical component of the diffuser plate according to Example 1 to k=−60, the diffusion intensity shape is a bimodal shape (a circular ring, three-dimensionally) as illustrated in FIG. 10A, and the flat diffusion angle distribution characteristics are not achieved.

Comparative Example 6

In Comparative Example 6 that increases the variation of the curvature radius in Comparative Example 5 to ±20%, the diffusion intensity shape is a bimodal shape (a circular ring, three-dimensionally) as illustrated in FIG. 10B, and the flat diffusion angle distribution characteristics are not achieved.

As is obvious from the above results, the high-order diffraction component is reduced, and the flat diffusion angle distribution characteristics are achieved, by using the diffuser plate 1 in which the single lens group 20 according to the present invention is formed.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST

1 diffuser plate
10 transparent substrate
20 single lens group
21 single lens

The invention claimed is:

1. A microlens array diffuser plate comprising a single lens group positioned on a surface of a transparent substrate,
wherein curvature radii of respective single lenses composing the single lens group are varied as a whole, and peak positions of the respective single lenses are located irregularly, and
a lens surface shape of each of the single lenses in the single lens group is hyperboloid and satisfies the following Equation 1 and Equation 2,

[Math. 1]

$$z = \frac{cx^2}{1 + \sqrt{1 - (1+k)c^2 x^2}} \quad \text{(Equation 1)}$$

$$-40 \le k \le -20 \quad \text{(Equation 2)}$$

where, in the above Equation 1 and Equation 2,
z represents a height difference with a reference plane that is a plane which passes through a peak of the single lens in a height direction and is orthogonal to a lens optical axis of the single lens,
c represents an inverse of a curvature radius of the single lens,
x represents a separation distance from the lens optical axis of the single lens, and
k represents a conic coefficient.
2. The diffuser plate according to claim 1, wherein the respective single lenses are located adjacent to each other.
3. The diffuser plate according to claim 2, wherein a boundary between the single lenses adjacent to each other includes a curving line.
4. The diffuser plate according to claim 1, wherein the curvature radius of the single lens is larger than a maximum value of a pitch between single lenses in the single lens group, and in a case in which a circumscribed circle that circumscribes a single lens is considered, a minimum value of a diameter of the circumscribed circle in the single lens group is larger than the maximum value of the pitch between the single lenses.
5. The diffuser plate according to claim 1, wherein the peak positions of the respective single lenses composing the single lens group are located irregularly within a range of a radius Δr with respect to positions of peaks of the respective single lenses in a case in which the single lenses are located regularly, and in a case in which a circumscribed circle that circumscribes a single lens is considered, the respective single lenses composing the single lens group satisfy Δr/a≠0, where a represents a diameter of the circumscribed circle in each single lens.

6. The diffuser plate according to claim 1, wherein the transparent substrate is any of a quartz glass, a borosilicate glass, or a white plate glass.

7. A display device comprising the diffuser plate according to claim 1.

8. A projection device comprising the diffuser plate according to claim 1.

9. A lighting device comprising the diffuser plate according to claim 1.

10. The diffuser plate according to claim 1, wherein a value of the conic coefficient is −35≤k≤−25.

11. The diffuser plate according to claim 1, wherein the curvature radii of the respective single lenses are set irregularly.

* * * * *